United States Patent
Kato et al.

(10) Patent No.: US 7,168,410 B2
(45) Date of Patent: Jan. 30, 2007

(54) IDLE SPEED CONTROLLER FOR INTERNAL COMBUSTION ENGINE

(75) Inventors: Toshikazu Kato, Toyota (JP); Naohide Fuwa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/253,550

(22) Filed: Oct. 20, 2005

(65) Prior Publication Data

US 2006/0086338 A1    Apr. 27, 2006

(30) Foreign Application Priority Data

Oct. 22, 2004   (JP)   ............... 2004-308155

(51) Int. Cl.
   *F02D 41/16*   (2006.01)
   *F01L 1/34*    (2006.01)
(52) U.S. Cl. ............... 123/339.15; 123/90.15; 123/339.14; 123/339.22
(58) Field of Classification Search ............ 123/90.11, 123/90.15, 90.17, 339.14, 339.15, 339.22, 123/339.24

See application file for complete search history.

(56) References Cited

U.S. PATENT DOCUMENTS 6,877,468 B2 * 4/2005 Tsujimura et al. ....... 123/90.15

2001/0004885 A1 * 6/2001 Fujiwara et al. ......... 123/90.15

FOREIGN PATENT DOCUMENTS

| JP | 2001-263015 | 9/2001 |
|----|-------------|--------|
| JP | 2003-065131 | 3/2003 |

* cited by examiner

*Primary Examiner*—T. M. Argenbright
(74) *Attorney, Agent, or Firm*—Kenyon & Kenyon LLP

(57) ABSTRACT

An idle speed controller for an internal combustion engine provided with an intake variable valve timing mechanism for varying valve timing and a variable working angle for varying a valve working angle of an intake valve. The controller performs idle speed control. When an advancement failure occurs in the intake variable valve timing mechanism, the controller performs idle-up control to increase the target idle speed. When the valve working angle of the intake variable working angle mechanism is less than a predetermined value, the electronic control unit changes an increase amount of the target idle speed to a lower value if an advancement failure occurs when performing the idle-up as compared to when the valve working angle is greater than the predetermined value.

16 Claims, 6 Drawing Sheets

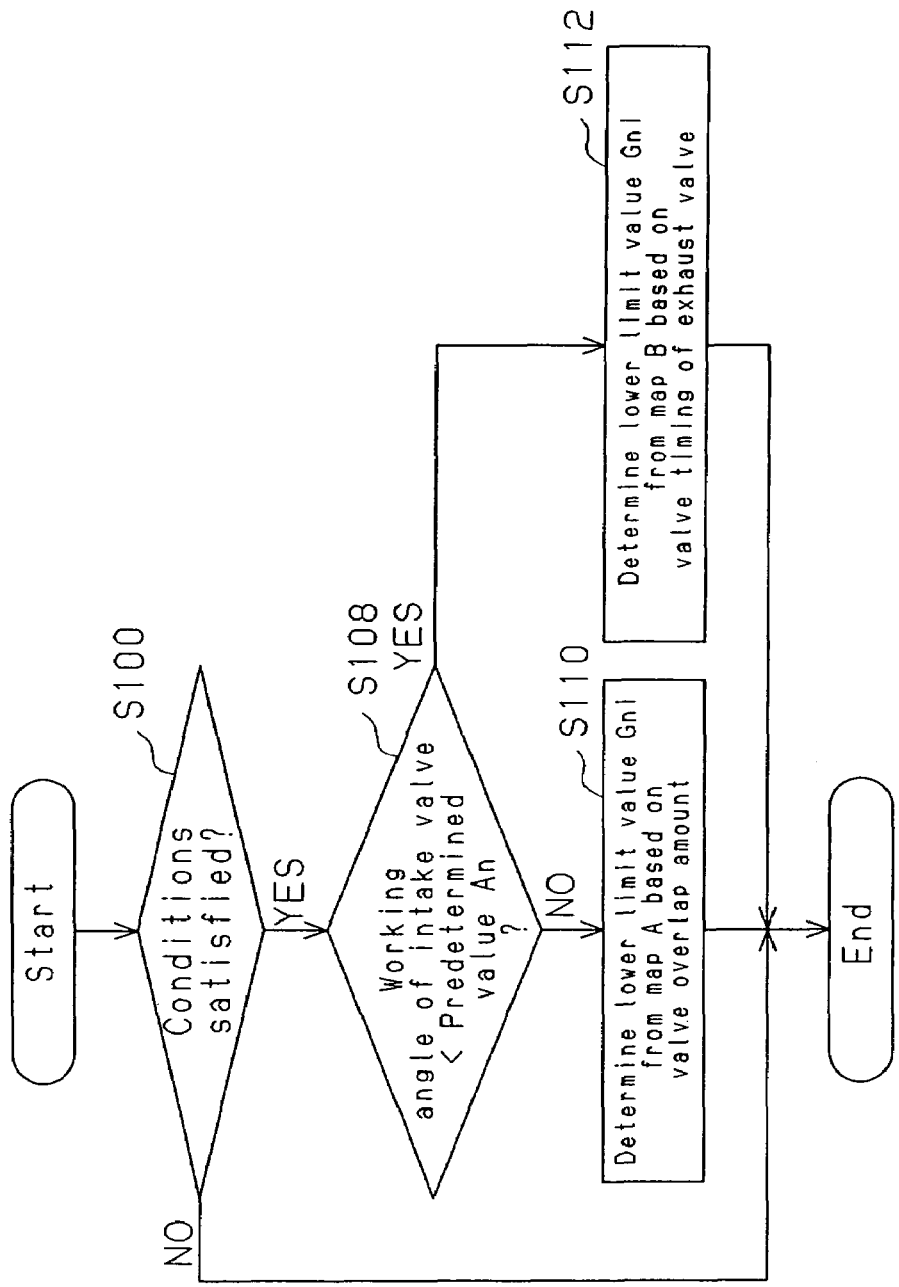

IDLE SPEED CONTROLLER FOR INTERNAL COMBUSTION ENGINE

BACKGROUND OF THE INVENTION

The present invention relates to an idle speed controller for application in an internal combustion engine provided with a variable valve timing mechanism and a variable working angle mechanism, and more particularly, to an improvement of a control structure for preventing misfires when an angle advancement failure occurs in a variable valve timing mechanism.

In the prior art, a variable valve timing mechanism is used to vary the valve timing of an intake valve and an exhaust valve. The variable valve timing mechanism uses a hydraulic or electric actuator to alter the rotation angle of a camshaft relative to a crankshaft in order to vary the valve timing of an intake valve and an exhaust valve. In an internal combustion engine that uses such a variable valve timing mechanism for its intake system, misfires may occur when the engine is idling. Such misfires occur when the valve timing of the intake valve is advanced from the intended timing. Such a state is referred to as an advancement failure of the variable valve timing mechanism. The intake air amount is small when the engine is idling. If an advancement failure occurs in such a state, overlap between the periods in which the intake and exhaust valves are both open (hereafter, referred to as "valve overlap") increases. This increases internal exhaust gas recirculation (EGR) and deteriorates combustion conditions.

To solve this problem, Japanese Patent Laid-Open Publication 2003-65131 proposes a technique for setting a target idle speed to a value higher than normal during execution of idle speed control when an advancement failure occurs in the variable valve timing mechanism. Such a technique is referred to as "idle-up control". The engine speed is increased when the engine is idling to increase the intake air amount. This lowers the influence that an increase in internal EGR caused by an advancement failure has on combustion. This relieves the effect on the combustion conditions by the increase in the internal EGR caused by an advancement failure. Accordingly, idle-up control prevents misfires that would be caused by an advancement failure in the variable valve timing mechanism.

Japanese Patent Laid-Open Publication 2001-263015 describes a variable working angle mechanism that varies the valve working angle of intake and exhaust valves (range of crank angle from when the valve opens to when the valve closes). In an internal combustion engine that uses such variable working angle mechanism for its intake system, the amount of air drawn into a cylinder is adjusted not only by varying the throttle open amount but also by varying the valve working angle of the intake valve. Therefore, the required amount of air drawn into the cylinder is ensured through the combination of the throttle open amount and the valve working angle. For example, when the engine is operating at a predetermined throttle open amount and valve working angle, the throttle open amount may be increased or decreased. In such a case, the amount of air drawn into a cylinder is kept constant by decreasing or increasing the valve working angle of the intake valve so as to decrease or increase the drawn in air amount by the amount of air that is increased or decreased by the increase or decrease of the throttle open amount. Even though the air amount is kept constant, a fluctuation may occur in the amount of pumping loss or compression end pressure and compression end temperature (the pressure and temperature in a cylinder at the compression top dead center) depending on the combination of the throttle open amount and the valve working angle. Therefore, in an internal combustion engine using such a variable working angle mechanism for its intake system, the combination of the throttle open amount and the valve working angle is changed if necessary even when the air amount is constant. This enables the air amount to be controlled so that the internal combustion engine is operated under further favorable conditions.

In an internal combustion engine that executes air amount control in such a manner, the valve working angle of the intake valve is not always constant even when the engine is idling. Thus, depending on the setting of the valve working angle, when an advancement failure occurs in the variable valve timing mechanism, the increase amount of the internal EGR relative to an increase of valve overlap may change. In such an internal combustion engine, if the idle-up control is performed in the same manner whenever an advancement failure occurs, the idle-up amount may become excessive or insufficient. As a result, execution of unnecessary idle-up control may lower the fuel efficiency when the idle-up amount is excessive or cause misfires when the idle-up amount is insufficient.

SUMMARY OF THE INVENTION

It is an object of the present invention to provide an idle speed controller for an internal combustion engine provided with a variable valve timing mechanism and a variable working angle mechanism capable of efficiently and effectively preventing the occurrence of misfires in the internal combustion engine when a failure occurs in the variable valve timing mechanism.

One aspect of the present invention is an idle speed controller for executing idle speed control for an internal combustion engine including an intake valve and an exhaust valve. The idle speed controller includes either one of an intake variable working angle mechanism for variably setting an working angle of the intake valve and an exhaust variable working angle mechanism for variably setting an working angle of the exhaust valve. A variable valve timing mechanism variably sets valve timing for the intake valve. An electronic control unit executes idle speed control. When the internal combustion engine is idling and an advancement failure of the variable valve timing mechanism occurs thereby advancing the valve timing of the intake valve from an intended timing, the electronic control unit performs idle-up during execution of the idle speed control to increase a target idle speed. When the working angle set by either one of the intake and exhaust variable working angle mechanism is less than a predetermined value, the electronic control unit changes an increase amount of the target idle speed to a lower value if an advancement failure occurs when performing the idle-up as compared to when the working angle is greater than the predetermined value.

A further aspect of the present invention is an idle speed controller for executing idle speed control for an internal combustion engine including an intake valve and an exhaust valve. The idle speed controller includes either one of an intake variable working angle mechanism for variably setting an working angle of the intake valve and an exhaust variable working angle mechanism for variably setting an working angle of the exhaust valve. A variable valve timing mechanism variably sets valve timing of the intake valve. An electronic control unit executes idle speed control. When the engine is idling and an advancement failure of the variable valve timing mechanism occurs thereby advancing the valve timing of the intake valve from an intended timing, the electronic control unit performs idle-up during execution of the idle speed control to increase a target idle speed. When the working angle set by either one of the intake and exhaust variable working angle mechanism is less than a predetermined value, the electronic control unit prohibits the idle-up if an advancement failure occurs.

Another aspect of the present invention is an idle speed controller for executing idle speed control for an internal combustion engine including an intake valve and an exhaust valve. The idle speed controller includes either one of an intake variable working angle mechanism for variably setting an working angle of the intake valve and an exhaust variable working angle mechanism for variably setting an working angle of the exhaust valve. A variable valve timing mechanism variably sets valve timing of the intake valve. An electronic control unit for executing idle speed control. When the internal combustion engine is idling and a retardation failure of the variable valve timing mechanism occurs thereby retarding the valve timing of the intake valve from an intended timing, the electronic control unit performs idle-up during execution of the idle speed control to increase a target idle speed. When the working angle set by either one of the intake and exhaust variable working angle mechanism is less than a predetermined value, the electronic control unit changes an increase amount of the target idle speed to a lower value if a retardation failure occurs when performing the idle-up as compared to when the working angle is greater than the predetermined value.

A further aspect of the present invention is an idle speed controller for executing idle speed control for an internal combustion engine including an intake valve and an exhaust valve. The idle speed controller includes either one of an intake variable working angle mechanism for variably setting an working angle of the intake valve and an exhaust variable working angle mechanism for variably setting an working angle of the exhaust valve. A variable valve timing mechanism variably sets valve timing of the intake valve. An electronic control unit executes idle speed control. When the engine is idling and a retardation failure of the variable valve timing mechanism occurs thereby retarding the valve timing of the intake valve from an intended timing, the electronic control unit performs idle-up during execution of the idle speed control to increase a target idle speed. When the working angle set by either one of the intake and exhaust variable working angle mechanism is less than a predetermined value, the electronic control unit prohibits the idle-up if an advancement failure occurs.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8 is a flowchart showing the procedures for setting the lower limit value.

DETAILED DESCRIPTION OF THE PREFERRED EMBODIMENTS

A preferred embodiment of the present invention will now be described with reference to the drawings.

Figure 1:
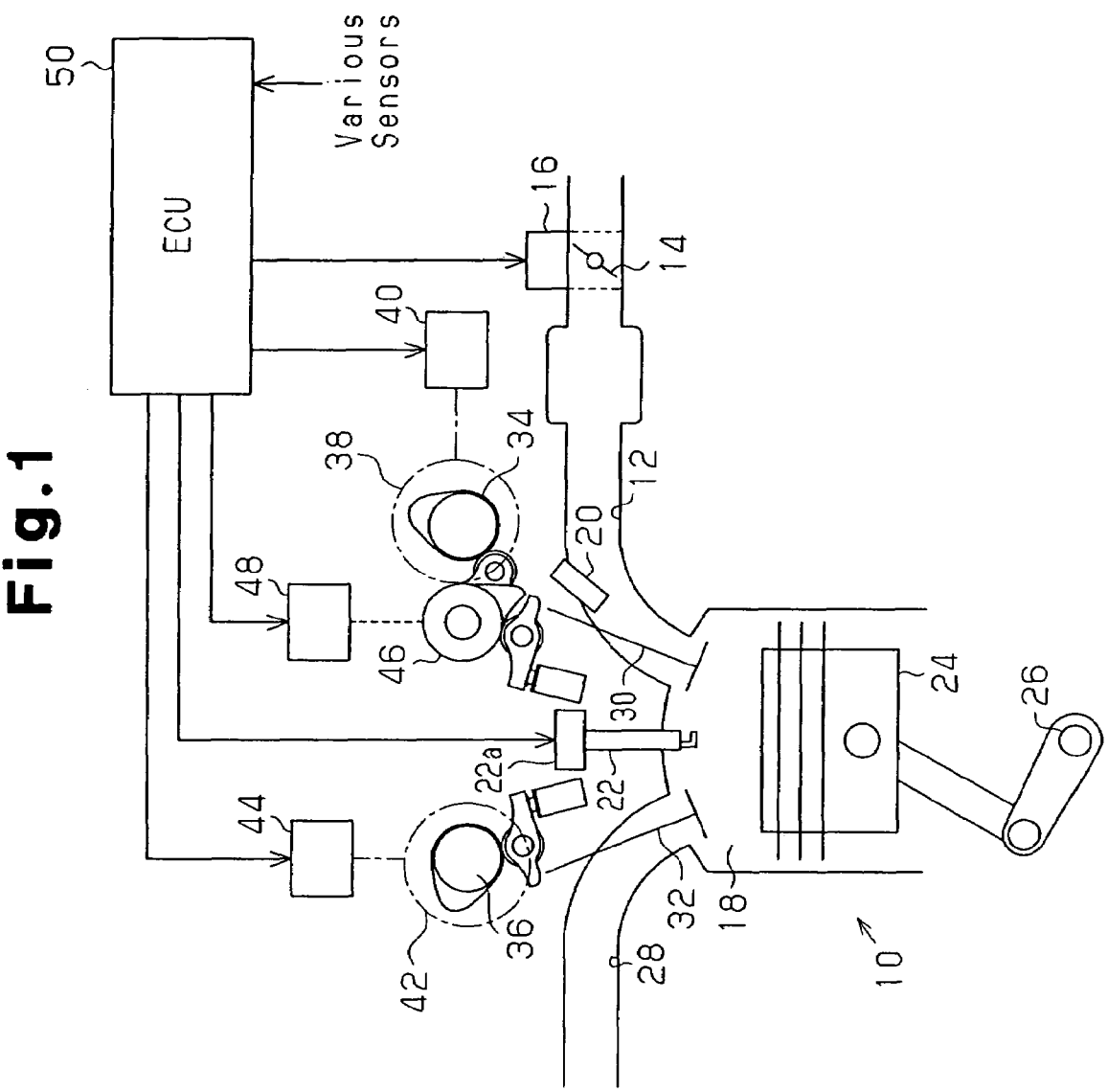
FIG. 1 is a schematic diagram showing a preferred embodiment of the present invention.

As shown in FIG. 1, an internal combustion engine 10 includes an intake passage 12 provided with a throttle valve 14. The throttle valve 14 is connected to a throttle motor 16. The throttle motor 16 is driven to adjust the amount the throttle valve 14 is open (throttle open amount TA) and control the amount of air drawn into a combustion chamber 18 through the intake passage 12. The intake passage 12 further includes an injector 20, which injects fuel into the intake passage 12.

Air-fuel mixture formed by intake air and injected fuel is ignited by an ignition plug 22 in the combustion chamber 18 of the internal combustion engine 10. The ignition timing of the ignition plug 22 is adjusted by an igniter 22a. The ignition burns the air-fuel mixture and reciprocates a piston 24 so as to rotate a crankshaft 26. Subsequent to combustion, the air-fuel mixture is discharged as exhaust from the combustion chamber 18 and into an exhaust passage 28.

In the internal combustion engine 10, the intake passage 12 and the combustion chamber 18 are connected to and disconnected from each other by opening and closing of an intake valve 30. The combustion chamber 18 and the exhaust passage 28 are connected to and disconnected from each other by opening and closing of an exhaust valve 32. Rotation of an intake camshaft 34 opens and closes the intake valve 30. Rotation of an exhaust camshaft 36 opens and closes the exhaust valve 32. Rotation of the crankshaft 26 rotates the intake camshaft 34 and the exhaust camshaft 36.

Figure 2:
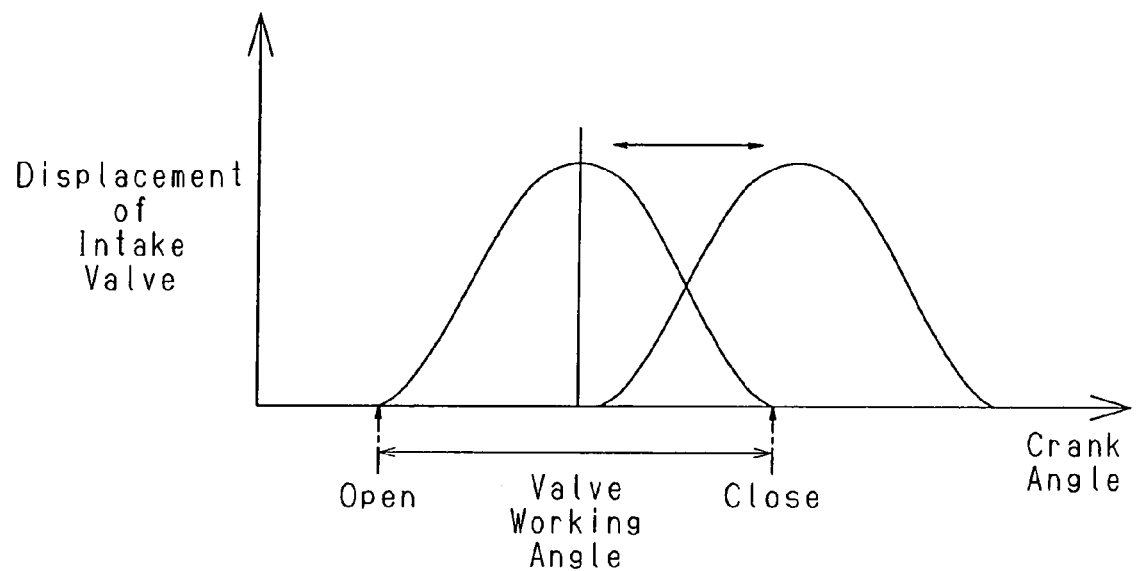
FIG. 2 is a graph showing changes in the valve timing of an intake valve when an intake variable valve timing mechanism is actuated.

The intake camshaft 34 is provided with an intake variable valve timing mechanism 38. The intake variable valve timing mechanism 38 adjusts the rotation angle of the intake camshaft 34 relative to the rotation angle of the crankshaft 26 (crank angle) so as to advance or retard the opening or closing timing (valve timing) of the intake valve 30. The intake variable valve timing mechanism 38 is actuated by controlling the hydraulic pressure applied to the mechanism 38 by an actuator 40 such as a hydraulic control valve. FIG. 2 shows changes in the valve timing of the intake valve 30 when the intake variable valve timing mechanism 38 is actuated. As shown in FIG. 2, when the valve timing is varied, the opening timing and the closing timing of the intake valve 30 are both advanced or retarded in a state in which the valve working angle of the intake valve 30 (the range of the crank angle from opening to closing of the valve) is kept constant.

The exhaust camshaft 36 is provided with an exhaust variable valve timing mechanism 42. The exhaust variable valve timing mechanism 42 adjusts the rotation angle of the exhaust camshaft 36 relative to the crank angle so as to advance or retard the valve timing of the exhaust valve 32.

The exhaust variable valve timing mechanism 42 is actuated by controlling the hydraulic pressure applied to the mechanism 42 by an actuator 44 such as a hydraulic control valve. In the same manner as in the intake valve 30, the opening timing and the closing timing of the exhaust valve 32 are both advanced or retarded in a state in which the valve working angle of the exhaust valve 32 is kept constant. In this embodiment, the exhaust variable valve timing mechanism 42 functions as a variable exhaust valve closing timing mechanism for varying the closing timing of the exhaust valve.

Figure 3:
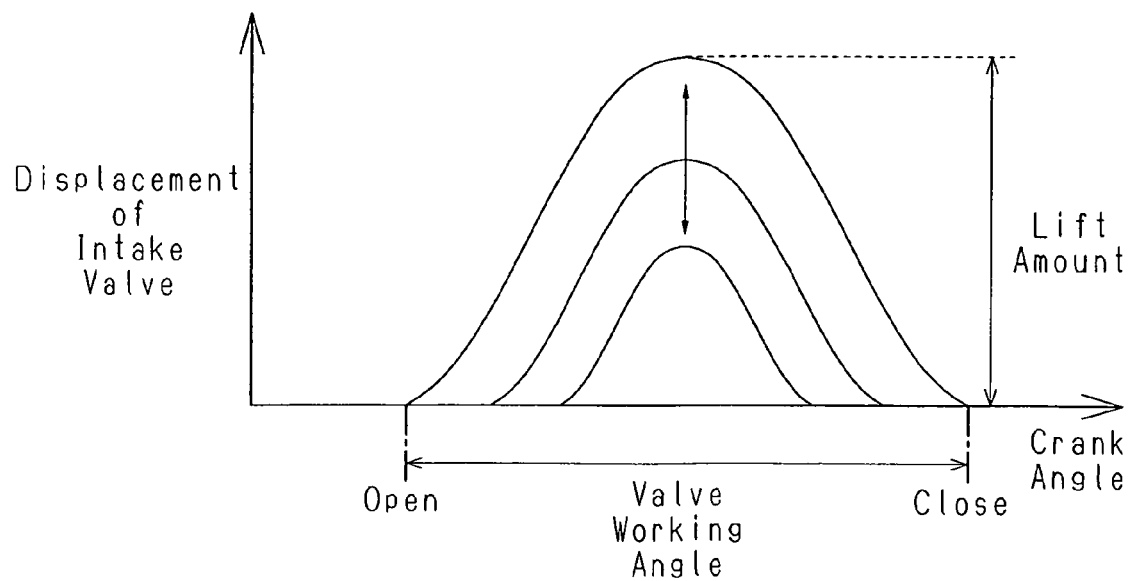
FIG. 3 is a graph showing changes in the valve working angle of the intake valve when a variable working angle mechanism is actuated.

An intake variable working angle mechanism (hereafter referred to as "variable working angle mechanism") 46 is arranged between the intake camshaft 34 and the intake valve 30. The variable working angle mechanism 46 variably sets the valve working angle of the intake valve 30 in accordance with operation conditions of the engine. The variable working angle mechanism 46 is actuated by driving an actuator 48 such as an electric motor. FIG. 3 shows changes in the valve working angle of the intake valve 30 caused by actuation of the variable working angle mechanism 46. As shown in FIG. 3, the actuation of the variable working angle mechanism 46 varies the valve working angle of the intake valve 30 in synchronization with the lift amount. For example, as the valve working angle decreases, the lift amount decreases. When the valve working angle is increased, the interval between the opening timing and the closing timing of the intake valve 30 increases. This lengthens the open period of the intake valve 30.

In this embodiment, the intake air amount is adjusted by cooperation between control of the open amount of the throttle valve 14 (throttle control) (see FIG. 1) and control of actuation of the variable working angle mechanism 46 (variable valve working angle control). The intake air amount increases when the throttle open amount TA increases and when the valve working angle of the intake valve 30 increases. Therefore, during the cooperative control, the throttle control and the variable valve working angle control are respectively executed such that the throttle open amount TA is set to be relatively small when increasing the valve working angle of the intake valve 30, and the throttle open amount TA is set to be relatively large when decreasing the valve working angle of the intake valve 30. This adjusts the intake air amount in a desired manner. The valve working angle of the intake valve 30 is adjusted by the cooperative control so that the valve working angle is smaller after the internal combustion engine 10 is warmed than before it is warmed. More specifically, the valve working angle of the intake valve 30 is adjusted so that it is smaller when the temperature of engine coolant is higher.

The idle speed controller of this embodiment has various sensors for detecting operation conditions of the internal combustion engine 10. These sensors include, for example, a crank sensor for detecting the speed of the crankshaft 26 (engine speed) and a coolant temperature sensor for detecting the temperature of the engine coolant. Further sensors include an accelerator sensor for detecting the accelerator pedal depression amount and a brake switch for detecting whether or not a brake pedal is depressed. Other sensors include a position sensor for detecting the valve timing of the intake valve 30, a position sensor for detecting the valve timing of the exhaust valve 32, and an working angle sensor for detecting the valve working angle of the intake valve 30, which is set by the variable working angle mechanism 46 (i.e., the actuation amount of the variable working angle mechanism 46).

The internal combustion engine 10 includes an electronic control unit (ECU) 50 incorporating a microcomputer or the like. The ECU 50 receives detection signals from the various sensors and performs various computations. Based on results of these computations, the ECU 50 executes the cooperative control as well as the engine control including control of the drive of the injector 20 (fuel injection control), control of the actuation of the intake variable valve timing mechanism 38, and control of the actuation of the exhaust variable valve timing mechanism 42.

The ECU 50 executes various type of engine control such as idle speed control. In the idle speed control, a target engine speed during idling of the internal combustion engine 10 (target idle speed Tni) is computed based on the temperature of the engine coolant. The target idle speed Tni is set at a value that minimizes fuel consumption while continuing stable operation of the internal combustion engine 10. The cooperative control and the fuel injection control are then executed such that the target idle speed Tni matches the engine speed.

When an advancement failure occurs in the intake variable valve timing mechanism 38, the idle speed control sets the target idle speed Tni at a value that is higher than when no advancement failure occurs. Such control is referred to as "idle-up control".

More specifically, it is determined that an advancement failure has occurred when the internal combustion engine 10 is idling if a state in which the valve timing of the intake valve 30 is advanced from its target by a predetermined amount or more continues for a predetermined time or longer. In this case, a lower limit value Gni is set for the target idle speed Tni. Further, based on the lower limit value Gni, lower limit guard processing is executed. For example, if the target idle speed Tni that is computed based on the engine coolant temperature is lower than the lower limit value Gni, the lower limit value Gni is set as the target idle speed Tni.

Idle-up increases the injected fuel amount and the intake air amount so as to increase the engine speed. This prevents the occurrence of misfires that would be caused by an advancement failure in the intake variable valve timing mechanism 38.

In this embodiment, it is also determined whether a retardation failure has occurred in the exhaust variable valve timing mechanism 42 when the internal combustion engine 10 is idling. A retardation failure refers to a state in which the valve timing of the exhaust valve 32 is retarded from its normal timing (retarded from a target during variable control of the valve timing). More specifically, it is determined that a retardation failure has occurred when the internal combustion engine 10 is idling if a state in which the valve timing of the exhaust valve 32 is retarded from its target for a predetermined time or more continues for a predetermined amount or longer.

The ECU 50 makes such a determination of occurrence of an advancement failure in the intake variable valve timing mechanism 38 and occurrence of a retardation failure in the exhaust variable valve timing mechanism 42.

Figure 4:
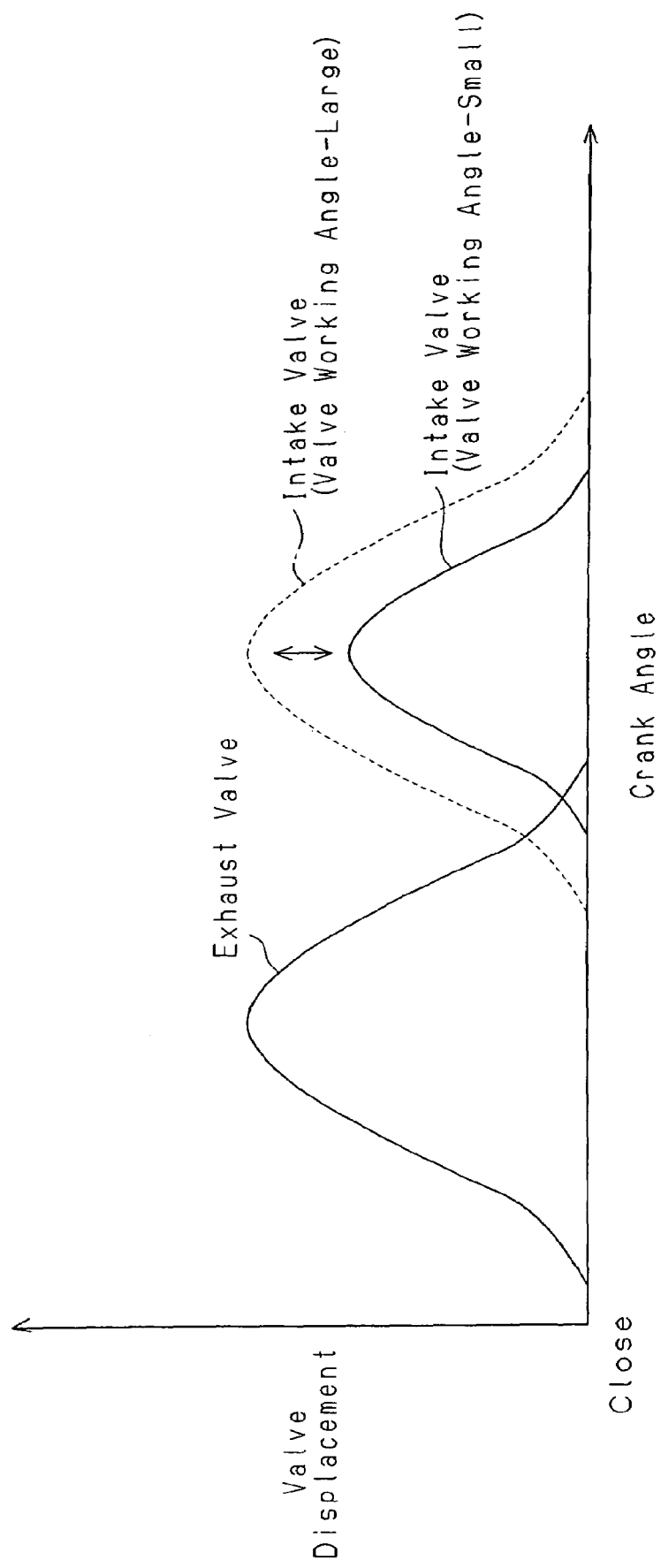
FIG. 4 is a graph showing the relationship between the valve working angle of the intake valve and a valve overlap amount.

FIG. 4 shows the valve working angle of the intake valve 30 and the valve overlap amount. The valve overlap amount refers to the period during which the valve working angle of the intake valve 30 overlaps with the valve working angle of the exhaust valve 32.

As shown in FIG. 4, the valve overlap amount decreases as the valve working angle of the intake valve 30 decreases. Therefore, if an advancement failure occurs in the intake variable valve timing mechanism 38, the internal EGR decreases as the valve working angle of the intake valve 30 decreases. For this reason, the combustion conditions deteriorate less when the valve working angle of the intake valve 30 is small. Accordingly, misfires are effectively prevented by decreasing the valve working angle of the intake valve 30 when an advancement failure occurs even if the increase amount of the target idle speed Tni is small when performing the idle-up control.

In this embodiment, the valve timing of the intake valve 30 is advanced by decreasing the valve working angle of the intake valve 30 since a valve overlap amount is always necessary. Therefore, if the valve working angle of the intake valve 30 is extremely small, the valve timing of the intake valve 30 is advanced to a timing that is close to the limit. Accordingly, in this state, an increase in the valve overlap amount resulting from an advancement failure or deterioration of the combustion conditions resulting from an advancement failure seldom occurs.

Accordingly, in this embodiment, the lower limit value Gni of the target idle speed Tni is set at a lower value when the valve working angle of the intake valve 30 is smaller than a predetermined value than when the valve working angle is larger than the predetermined value.

The procedures for setting the lower limit value Gni (lower limit value setting processing) will be described in detail with reference to the flowchart of FIG. 5. The series of procedures shown in the flowchart are executed by the ECU 50 in predetermined cycles.

Figure 5:
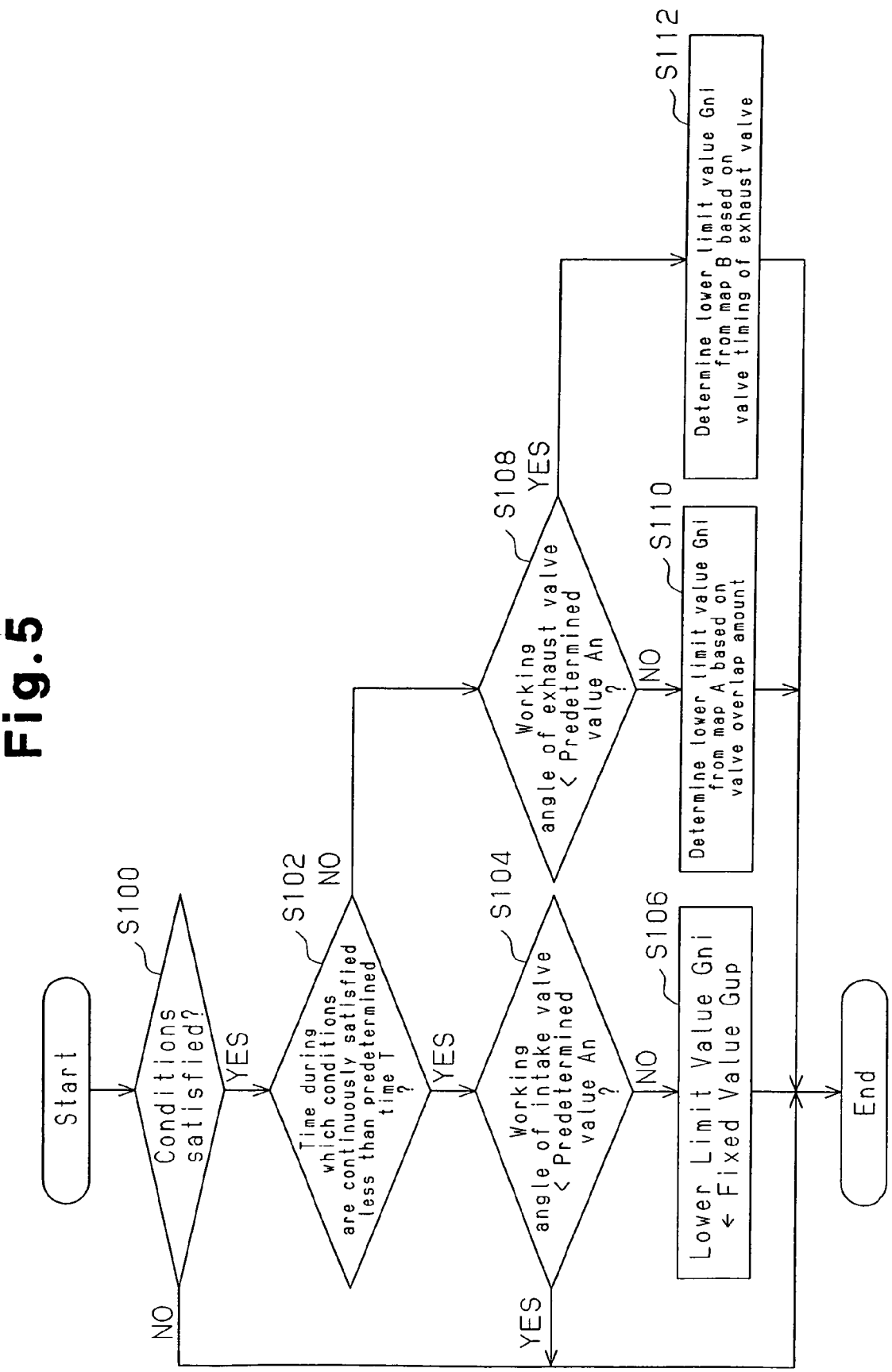
FIG. 5 is a flowchart showing the procedures for setting a lower limit value.

As shown in FIG. 5, it is first determined whether or not certain conditions are satisfied (step S100). The following two conditions must both be satisfied.

1) The internal combustion engine 10 is idling. More specifically, the internal combustion engine 10 is determined to be idling when the accelerator pedal is not being depressed or the brake pedal is being depressed.

2) An advancement failure has occurred in the intake variable valve timing mechanism 38 or a retardation failure has occurred in the exhaust variable valve timing mechanism 42.

If the conditions are not satisfied (NO in step S100), the processing is temporarily terminated without proceeding further.

When the conditions are satisfied after repeated execution of the processing (YES in step S100), it is then determined whether the time during which the precondition has continuously been satisfied is less than a predetermined time T (step S102).

If the time is less than the predetermined time T (YES in step S102), the lower limit value Gni is set as described below.

It is first determined whether or not the valve working angle of the intake valve 30 is smaller than a predetermined value An (step S104).

If the valve working angle of the intake valve 30 is equal to or greater than the predetermined value An (NO in step S104), the lower limit value Gni is set to a fixed value Gup (step S106).

In this case, it is highly possible that the valve overlap amount has been increased since the valve working angle of the intake valve 30 is relatively large. This may seriously deteriorate the combustion conditions. Moreover, the internal combustion engine 10 has just started to idle. Thus, the engine speed may suddenly decrease and temporarily become much lower than the target idle speed Tni. In such a state, the engine speed may become excessively low.

Accordingly, the lower limit value Gni is set to the fixed value Gup. The fixed value Gup is determined based on experimental results or the like so as to prevent excessive decrease in the engine speed even if the engine speed suddenly decreases immediately after the internal combustion engine 10 starts to idle.

If the valve working angle of the intake valve 30 is smaller than the predetermined value An (YES in step S104), the increase in the valve overlap amount will be small even if the valve overlap amount increases. Therefore, deterioration in the combustion conditions is subtle. In such a case, the processing is temporarily terminated without setting the lower limit value Gni. In other words, the setting of the lower limit value Gni and the execution of idle-up control are disabled. This prevents an increase in noise level that would be caused by an excessive increase in the engine speed and also prevent the fuel efficiency from being deteriorated that would be caused by an unnecessary increase in the fuel injection amount.

When the time during which the conditions are continuously satisfied becomes longer than the predetermined time T after repeated execution of this processing (NO in step S102), the lower limit value Gni is set in the following manner.

First, it is determined whether or not the valve working angle of the intake valve 30 is smaller than the predetermined value An (step S108).

If the valve working angle of the intake valve 30 is equal to or greater than the predetermined value An (NO in step S108), the lower limit value Gni is determined from a map A based on the valve overlap amount (step S110).

In this case, it is highly possible that the valve overlap amount has increased since the valve working angle of the intake valve 30 is set at a relatively large value. This may seriously deteriorate the combustion conditions. To avoid such a state, the lower limit value Gni is set in accordance with the valve overlap amount. More specifically, the lower limit value Gni is set to a value that prevents misfires from occurring while minimizing the increase in fuel consumption after the engine speed is relatively stabilized and does not fluctuate. That is, the lower limit value Gni is a value that limits the target idle speed Tni at a higher speed as the valve overlap amount becomes larger and limits the target idle speed Tni at a lower speed than the fixed value Gup.

Figure 6:
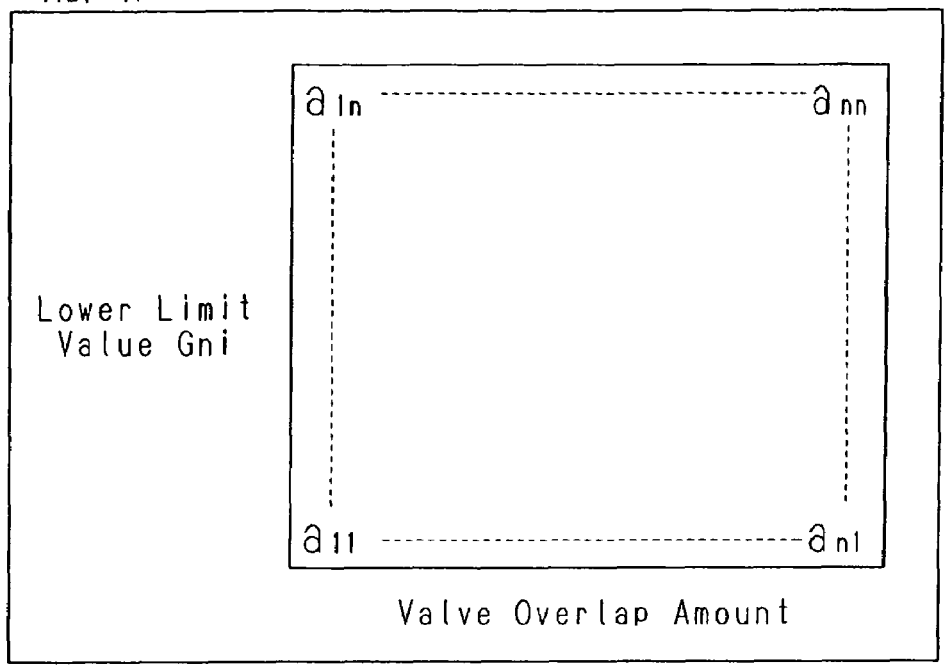
FIG. 6 is a schematic diagram showing a map A that is used to set the lower limit value.

Referring to FIG. 6, map A is used to determine the lower limit value Gni based on the valve overlap amount. In map A, the relationship between the lower limit value Gni and the valve overlap amount is set based on experimental results or the like. The valve overlap amount used in the map computation is obtained based on the valve timing and valve working angle of the intake valve 30 and the valve timing of the exhaust valve 32.

If the valve working angle of the intake valve 30 is smaller than the predetermined value An (YES in step S108), the lower limit value Gni is determined from map B based on the valve timing of the exhaust valve 32 (step S112).

The reason for using the valve timing of the exhaust valve 32 as a parameter for computing the lower limit value Gni will now be described.

In an internal combustion engine that variably sets the valve timing of the exhaust valve, the closing timing of the exhaust valve may be set at a timing that is significantly retarded from the top dead center of the piston. In such a case, the exhaust valve will be opened for a relatively long period during an intake stroke. Therefore, even if the valve working angle of the intake valve is small and the valve overlap amount small, exhaust discharged into an exhaust passage is drawn back into the cylinder. This increases internal EGR. Accordingly, even if the valve working angle of the intake valve is small, internal EGR may significantly increase and cause misfires when the closing timing of the exhaust valve is greatly retarded.

In the internal combustion engine 10 of this embodiment, the internal EGR will not increase to a level that causes misfires. Still, the combustion conditions may deteriorate. In order to prevent such deterioration, the lower limit value Gni is set in accordance with the valve timing of the exhaust valve 32.

Figure 7:
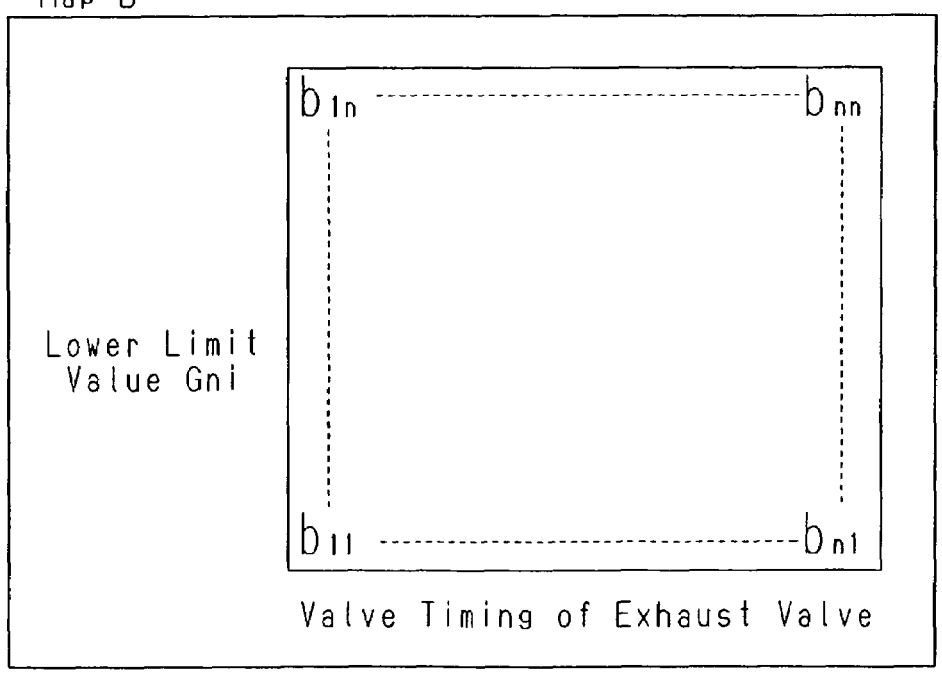
FIG. 7 is a schematic diagram showing a map B that is used to set the lower limit value.

Referring to FIG. 7, map B is used to obtain the lower limit value Gni based on the valve timing of the exhaust valve 32. Map B, which is set based on experimental results of the like, shows the relationship between the valve timing of the exhaust valve 32 and the lower limit value Gni that effectively prevents deterioration of the combustion conditions while minimizing increase in fuel consumption after the engine speed becomes relatively stable.

The lower limit value Gni determined from the map B is a value corresponding to a speed that is much lower than the target idle speed Tni. Thus, the lower limit value Gni does not affect the target idle speed Tni in most of the map B. In other words, the lower limit value Gni is a value at which idle-up is not performed. However, when the valve timing of the exhaust valve 32 is significantly retarded, the lower limit value Gni that restricts the target idle speed increases as the valve timing is further retarded, and the idle-up is performed based on the increased lower limit value Gni. The lower limit value Gni obtained in this case is a value corresponding to a speed that is lower than the lower limit value Gni when the valve working angle of the intake valve 30 is smaller than the predetermined value An.

After the lower limit value Gni is obtained in this manner, the processing is temporarily terminated.

This embodiment has the advantages described below.

(1) When an advancement failure occurs in the intake variable valve timing mechanism 38, the lower limit value Gni for limiting the target idle speed Tni is set to be lower when the valve working angle of the intake valve 30 is low compared to when the valve working angle of the intake valve 30 is high. Accordingly, for combustion conditions that differ depending on settings of the valve working angle of the intake valve 30, the lower limit value Gni and the increase amount of the target idle speed Tni is set at an appropriate value in accordance with the effect on the combustion conditions. This prevents the occurrence of misfires. Further, an increase in noise level that would be caused by excessive increase in the engine speed is prevented. The fuel efficiency is also prevented from being lowered such as when the fuel injection amount is excessive. As a result, it is possible to prevent the occurrence of misfire more efficiently and effectively during occurrence of an advancement failure in the intake variable valve timing mechanism 38.

(2) The execution of idle-up control is disabled when the valve working angle of the intake valve 30 is smaller than the predetermined value An. Therefore, the target idle speed Tni is not increased when the valve working angle is smaller than the predetermined value An, that is, when the increase in the degree of internal EGR due to occurrence of an advancement failure is relatively small and the possibility of occurrence of misfire is relatively low. This prevents the engine speed and injected fuel amount from being unnecessarily increased. As a result, the occurrence of misfires during occurrence of an advancement failure is prevented more efficiently and effectively.

(3) The lower limit value Gni is determined based on the valve overlap amount when the valve working angle of the intake valve 30 is larger than the predetermined value An after certain conditions have been continuously satisfied for the predetermined time T or longer, that is, when the combustion conditions may be deteriorated by the increase in the valve overlap amount. The lower limit value Gni is obtained based on the valve timing of the exhaust valve 32, when the valve working angle of the intake valve 30 is smaller than the predetermined value An, that is, when the combustion conditions may be deteriorated due to the closing timing of the exhaust valve 32 being greatly retarded. Accordingly, the lower limit value Gni and the target idle speed Tni are set using parameters that are currently most appropriate for the valve working angle of the intake valve 30. This prevents the occurrence of misfires during occurrence of an advancement failure further efficiently and effectively.

It should be apparent to those skilled in the art that the present invention may be embodied in many other specific forms without departing from the spirit or scope of the invention. Particularly, it should be understood that the present invention may be embodied in the following forms.

In the preferred embodiment, the lower limit value Gni is determined based on the valve timing of the exhaust valve 32 when the valve working angle of the intake valve 30 is smaller than the predetermined value An after the certain conditions have been continuously satisfied for the predetermined time T or longer. The valve timing used for determining the lower limit value Gni may be, for example, the opening timing of the exhaust valve 32, the timing when the displacement of the exhaust valve 32 becomes maximum, a timing indicative of the closing timing of the exhaust valve 32, or the closing timing of the exhaust valve 32 itself.

When the idle speed controller of the preferred embodiment is applied to a vehicle internal combustion engine having a transmission, a gearshift position of the transmission may also be employed as one of the parameters for determining the lower limit value Gni that is used in the processing of steps S110 and S112.

If the internal combustion engine 10 is capable of preventing the excessive decrease in the engine speed immediately after idling starts, the processing steps of S102 to S106 may be omitted as shown in the flowchart of FIG. 8.

In the preferred embodiment, the setting of the lower limit value Gni is changed when the valve working angle of the intake valve 30 is smaller than the predetermined value An and when the valve working angle of the intake period is equal to or greater than the predetermined value An. Instead, the setting of the lower limit value Gni may be changed three or more times in accordance with the valve working angle of the intake valve 30. Also, instead of changing the setting for a number of times, the lower limit value Gni may be set variably in accordance with the valve working angle of the intake valve 30 by determining the lower limit value Gni based on the valve working angle of the intake valve 30. It is only necessary that the lower limit value Gni for limiting the target idle speed Tni be lower when the valve working angle of the intake valve 30 is smaller than the predetermined value An than when the valve working angle is larger than the predetermined value An.

The idle speed controller of the preferred embodiment is also applicable to an internal combustion engine that is not provided with an exhaust variable valve timing mechanism 42. When the idle speed controller is applied to such an internal combustion engine, the step S112 may be omitted from the processing procedures for setting the lower limit value.

The present invention is not limited to a controller that executes idle-up control by setting the lower limit value for the target idle speed when performing the idle speed control. The present invention is also applicable to an idle speed controller that executes idle-up control by changing the method for computing the target idle speed or by computing a correction amount for changing the target idle speed. When the present invention is applied to such a controller, idle-up control may be performed during occurrence of an advancement failure by setting the increase amount in the target idle speed smaller when the valve working angle of the intake valve is smaller than a predetermined value than when the valve working angle is larger than the predetermined value. Alternatively, the idle-up control during occurrence of an advancement failure may be disabled when the valve working angle of the intake valve is smaller than the predetermined value.

In addition to an internal combustion engine in which the valve working angle of an intake valve is variably set in accordance with whether or not the engine has been warmed, the present invention may also be applied to an internal combustion engine in which the valve working angle of an intake valve is variably set in accordance with deposits adhered to the intake valve or its valve seat, in accordance with the state of use of electrical equipment such as headlights, or in accordance with the state of operation of an engine accessory such as an air compressor or an alternator.

In addition to an internal combustion engine having a variable working angle mechanism for variably setting the valve working angle of an intake valve, the present invention may also be applied to an internal combustion engine having a variable working angle mechanism for variably setting the valve working angle of an exhaust valve. In this case, idle-up control may be executed during occurrence of an advancement failure by setting the increase amount in the target idle speed smaller when the valve working angle of the exhaust valve is smaller than a predetermined value than when the valve working angle is larger than the predetermined value. Alternatively, idle-up control may be disabled during occurrence of an advancement failure when the valve working angle of the exhaust valve is smaller than the predetermined value.

The present invention may also be applied to an internal combustion engine having an exhaust variable valve timing mechanism and a variable working angle mechanism, which variably sets a valve working angle of an intake valve. The present invention may also be applied to an internal combustion engine having an exhaust variable valve timing mechanism and a variable working angle mechanism, which variably sets a valve working angle of an exhaust valve.

When a retardation failure occurs in the exhaust variable valve timing mechanism, the valve overlap amount of the intake valve and the exhaust valve becomes smaller and the internal EGR becomes less as the valve working angle of the intake valve (or the exhaust valve) is decreased by the variable working angle mechanism. Accordingly, the deterioration of the combustion conditions becomes lower as the valve working angle is smaller. Therefore, the deterioration in the combustion conditions becomes lower as the valve working angle becomes smaller. Thus, the occurrence of misfires is effectively prevented even if the increase amount in the target idle speed is set to a small value in the idle-up control during occurrence of a retardation failure.

Therefore, when idle-up control is performed during occurrence of a retardation failure in the internal combustion engine, the increase amount in the target idle speed may be set to a smaller value when the valve working angle set by the variable working angle mechanism is smaller than a predetermined value than when the valve working angle is larger than the predetermined value. Thus, the increase amount of the target idle speed is appropriately set in accordance with the valve working angle and the effect on the combustion conditions of the engine. As a result, it is possible to prevent the occurrence of misfires during occurrence of a retardation failure more efficiently and effectively, while suppressing excessive increase in the engine speed.

Further, in the internal combustion engine, idle-up control during occurrence of a retardation failure may be disabled when the valve working angle set by the variable working angle mechanism is smaller than a predetermined value. In this case, the increase in the target idle speed may be disabled when the valve working angle is smaller than the predetermined value, that is, when increase in the internal EGR due to the occurrence of a retardation failure is relatively low and the possibility of occurrence of misfires is low. Accordingly, it is possible to suppress the excessive increase in the engine speed and prevent the occurrence of misfires during occurrence of a retardation failure further efficiently and effectively.

The present examples and embodiments are to be considered as illustrative and not restrictive, and the invention is not to be limited to the details given herein, but may be modified within the scope and equivalence of the appended claims.

The invention claimed is:

1. An idle speed controller for executing idle speed control for an internal combustion engine including an intake valve and an exhaust valve, the idle speed controller comprising:

either one of an intake variable working angle mechanism for variably setting an working angle of the intake valve and an exhaust variable working angle mechanism for variably setting an working angle of the exhaust valve;

a variable valve timing mechanism for variably setting valve timing for the intake valve; and an electronic control unit for executing idle speed control;

wherein when the internal combustion engine is idling and an advancement failure of the variable valve timing mechanism occurs thereby advancing the valve timing of the intake valve from an intended timing, the electronic control unit performs idle-up during execution of the idle speed control to increase a target idle speed; and wherein when the working angle set by either one of the intake and exhaust variable working angle mechanism is less than a predetermined value, the electronic control unit changes an increase amount of the target idle speed to a lower value if an advancement failure occurs when performing the idle-up as compared to when the working angle is greater than the predetermined value.

2. The idle speed controller according to claim 1, wherein:

the internal combustion engine further includes a variable exhaust valve closing timing mechanism for varying closing timing for the exhaust valve; and the electronic control unit computes the target idle speed based on an overlap amount of valve opening periods of the intake valve and the exhaust valve when the working angle set by either one of the intake and exhaust variable working angle mechanisms is greater than the predetermined value, and the electronic control unit computes the target idle speed based on the closing timing of the exhaust valve when the working angle is less than the predetermined value.

3. An idle speed controller for executing idle speed control for an internal combustion engine including an intake valve and an exhaust valve, the idle speed controller comprising:
   either one of an intake variable working angle mechanism for variably setting an working angle of the intake valve and an exhaust variable working angle mechanism for variably setting an working angle of the exhaust valve;
   a variable valve timing mechanism for variably setting valve timing of the intake valve; and
   an electronic control unit for executing idle speed control;
   wherein when the internal combustion engine is idling and an advancement failure of the variable valve timing mechanism occurs thereby advancing the valve timing of the intake valve from an intended timing, the electronic control unit performs idle-up during execution of the idle speed control to increase a target idle speed; and
   wherein when the working angle set by either one of the intake and exhaust variable working angle mechanism is less than a predetermined value, the electronic control unit prohibits the idle-up if an advancement failure occurs.

4. The idle speed controller according to claim 3, wherein:
   the internal combustion engine further includes a variable exhaust valve closing timing mechanism for varying closing timing of the exhaust valve; and
   the electronic control unit computes the target idle speed based on an overlap amount of valve opening periods of the intake valve and the exhaust valve when the working angle set by either one of the intake and exhaust variable working angle mechanisms is greater than the predetermined value, and the electronic control unit computes the target idle speed based on the closing timing of the exhaust valve when the working angle is less than the predetermined value.

5. The idle speed controller according to claim 4, wherein the electronic control unit computes the target idle speed when the engine is idling if the valve timing of the intake valve has continuously been advanced from its control target position by a predetermined amount or more for a predetermined time or more.

6. The idle speed controller according to claim 5, wherein the electronic control unit determines whether or not to perform idle-up based on the working angle when the engine is idling if a state in which the valve timing of the intake valve is advanced from its control target position by a predetermined amount or more does not continue for a predetermined time or more.

7. The idle speed controller according to claim 6, wherein the electronic control unit performs idle-up by setting the target idle speed to a fixed value when the working angle is greater than the predetermined value, and the electronic control unit prohibits idle-up when the working angle is less than the predetermined value.

8. The idle speed controller according to claim 5, wherein the electronic control unit computes the target idle speed based on coolant temperature of the engine.

9. The idle speed controller according to claim 6, wherein the electronic control unit computes the target idle speed based on coolant temperature of the engine.

10. The idle speed controller according to claim 8, wherein the electronic control unit sets a lower limit value for the target idle speed when an advancement failure occurs, and performs the idle-up by setting the target idle speed based on the lower limit value if the computed target idle speed is lower than the lower limit value.

11. The idle speed controller according to claim 10, wherein the lower limit value for the target idle speed is increased in accordance with the overlap amount of the valve opening periods of the intake valve and the exhaust valve.

12. The idle speed controller according to claim 11, wherein the lower limit value for the target idle speed, set in accordance with the overlap amount, is set to be lower than the fixed value to which the target idle speed is set if the valve timing of the intake valve does not continue to be advanced from its control target position by a predetermined amount or more for a predetermined time or more when the engine is idling.

13. The idle speed controller according to claim 11, wherein the electronic control unit executes fuel injection amount control and an air amount control so that the engine speed becomes equal to the target idle speed.

14. The idle speed controller according to claim 11, wherein the air amount control includes controlling an open amount of a throttle valve and controlling actuation of the variable working angle mechanism.

15. An idle speed controller for executing idle speed control for an internal combustion engine including an intake valve and an exhaust valve, the idle speed controller comprising:
   either one of an intake variable working angle mechanism for variably setting an working angle of the intake valve and an exhaust variable working angle mechanism for variably setting an working angle of the exhaust valve;
   a variable valve timing mechanism for variably setting valve timing of the intake valve; and
   an electronic control unit for executing idle speed control;
   wherein when the internal combustion engine is idling and a retardation failure of the variable valve timing mechanism occurs thereby retarding the valve timing of the intake valve from an intended timing, the electronic control unit performs idle-up during execution of the idle speed control to increase a target idle speed; and
   wherein when the working angle set by either one of the intake and exhaust variable working angle mechanism is less than a predetermined value, the electronic control unit changes an increase amount of the target idle speed to a lower value if a retardation failure occurs when performing the idle-up as compared to when the working angle is greater than the predetermined value.

16. An idle speed controller for executing idle speed control for an internal combustion engine including an intake valve and an exhaust valve, the idle speed controller comprising:
   either one of an intake variable working angle mechanism for variably setting an working angle of the intake valve and an exhaust variable working angle mechanism for variably setting an working angle of the exhaust valve;
   a variable valve timing mechanism for variably setting valve timing of the intake valve; and
   an electronic control unit for executing idle speed control;
   wherein when the internal combustion engine is idling and a retardation failure of the variable valve timing mechanism occurs thereby retarding the valve timing of the intake valve from an intended timing, the electronic control unit performs idle-up during execution of the idle speed control to increase a target idle speed; and wherein when the working angle set by either one of the intake and exhaust variable working angle mechanism is less than a predetermined value, the electronic control unit prohibits the idle-up if an advancement failure occurs.

* * * * *